(12) United States Patent
Asanuma et al.

(10) Patent No.: US 6,901,743 B2
(45) Date of Patent: Jun. 7, 2005

(54) EXHAUST GAS PURIFYING METHOD, EXHAUST GAS PURIFYING APPARATUS, AND EXHAUST GAS COLLECTING APPARATUS OF INTERNAL COMBUSTION ENGINE

(75) Inventors: Takamitsu Asanuma, Susono (JP); Toshiaki Tanaka, Numazu (JP); Shinya Hirota, Susono (JP); Takanori Ueda, Susono (JP); Tetsuya Yamashita, Gotenba (JP); Yasuaki Nakano, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 7 days.

(21) Appl. No.: 10/452,636

(22) Filed: Jun. 3, 2003

(65) Prior Publication Data

US 2003/0233825 A1 Dec. 25, 2003

(30) Foreign Application Priority Data

Jun. 5, 2002 (JP) ........................................ 2002-163970

(51) Int. Cl.$^7$ ................................................ F01N 5/00
(52) U.S. Cl. ............................. 60/281; 60/274; 60/278; 60/287; 60/300
(58) Field of Search .......................... 60/274, 278, 279, 60/281, 287, 288, 297, 300, 284

(56) References Cited

U.S. PATENT DOCUMENTS

| | | | | |
|---|---|---|---|---|
| 3,645,098 A | * | 2/1972 | Templin et al. ................ | 60/288 |
| 5,207,734 A | * | 5/1993 | Day et al. ...................... | 60/278 |
| 5,419,124 A | * | 5/1995 | Adamczyk et al. ............ | 60/274 |
| 5,761,902 A | * | 6/1998 | Usami et al. .................. | 60/288 |
| 6,122,908 A | * | 9/2000 | Wirmark ....................... | 60/274 |
| 6,138,649 A | | 10/2000 | Khair et al. | |
| 6,250,073 B1 | | 6/2001 | Zimmer et al. | |
| 6,357,227 B1 | * | 3/2002 | Neufert ......................... | 60/309 |
| 2004/0060283 A1 | * | 4/2004 | Lee ............................... | 60/281 |

FOREIGN PATENT DOCUMENTS

| | | |
|---|---|---|
| DE | 43 42 296 C 1 | 11/1994 |
| GB | 1 349 051 | 3/1974 |
| JP | A 3-117665 | 5/1991 |
| JP | A 6-123259 | 5/1994 |
| JP | A 8-254159 | 10/1996 |
| JP | A 2002-70539 | 3/2002 |
| JP | 2002070539 | 3/2002 |
| JP | A 2002-147227 | 5/2002 |

* cited by examiner

*Primary Examiner*—Tu M. Nguyen
(74) *Attorney, Agent, or Firm*—Oliff & Berridge, PLC

(57) ABSTRACT

An exhaust gas collecting apparatus, of an internal combustion engine including a collection vessel that can hold exhaust gas, an exhaust gas taking-out passage through which exhaust gas is introduced from an exhaust passage to the collection vessel, an exhaust gas introduction passage through which the exhaust gas is introduced from the collection vessel to the exhaust passage at a position upstream from the catalytic converter, a first valve that is switchable between a position where the introduction of the exhaust gas from the exhaust passage to the exhaust gas taking-out passage is permitted and a position where the introduction of the exhaust gas is prevented, and a second valve that is switchable between a position where the introduction of the exhaust gas through the exhaust gas introduction passage is permitted and a position where the introduction of the exhaust gas is prevented.

33 Claims, 15 Drawing Sheets

EXHAUST GAS PURIFYING METHOD, EXHAUST GAS PURIFYING APPARATUS, AND EXHAUST GAS COLLECTING APPARATUS OF INTERNAL COMBUSTION ENGINE

BACKGROUND OF THE INVENTION

1. Field of the Invention

The present invention relates to an exhaust gas purifying method and an exhaust gas purifying apparatus of an internal combustion engine, and an exhaust gas collecting apparatus that can be used for the method and the apparatus.

2. Description of the Related Art

A catalytic converter that is used to purify the exhaust gas from an internal combustion engine has such characteristics that the catalytic converter cannot sufficiently exhibit its purification performance unless the catalytic converter is heated to a predetermined temperature range for activation. Therefore, various attempts are made to activate the catalytic converter rapidly. For example, the catalytic converter is disposed as close as possible to the exhaust port of the internal combustion engine. Alternatively, a delay control is carried out to intentionally delay the ignition timing at the time of cold start, thereby to try to rapidly activate the catalytic converter. However, when the catalytic converter is set close to the exhaust port, the catalytic converter is heated excessively after the warming up, and the catalytic converter is thermally degraded. In order to compensate for the reduction of the purification performance of the catalytic converter due to thermal degradation, it is effective to increase the holding quantity of a noble metal. In this case, the manufacturing cost of the catalytic converter increases. In the case of delaying the ignition timing, when the delay angle is made too large to obtain a maximum effect of temperature up, the combustion is aggravated, which aggravates the drivability. When the catalytic converter temperature-up speed is increased, the internal combustion engine discharges exhaust gas without purifying as it takes time from the starting of the warm-up till its completion.

Concerning the processing of the exhaust gas until the completion of the warm-up of the catalytic converter, Japanese Patent Application Laid-open No. 2002-70539 describes that it is possible to utilize an absorbent or the like for HC and utilize a zeolite catalyst for NOx. This publication also discloses that as a countermeasure against the emission of the trapped NOx from the catalytic converter by saturation of the zeolite catalyst, the exhaust gas passing through the catalytic converter is collected in a collection vessel such as a tank, and the collected exhaust gas is recirculated to an intake passage of the internal combustion engine in a similar manner to that of an exhaust gas recirculation (EGR) apparatus.

The apparatus described in Japanese Patent Application Laid-open No. 2002-70539 is based on the assumption that the zeolite catalyst traps NOx that is discharge data low temperature. The exhaust gas is collected only when the catalytic converter is substantially saturated and when the trapped NOx is discharged. When the zeolite catalyst is not yet saturated, the exhaust gas is not collected even if the catalytic converter is not sufficiently warmed up. For HC and CO, it is necessary to utilize means other than the zeolite catalyst, such as the HC absorbent, for example, to restrict the discharging of a HC and CO. Therefore, it is necessary to provide the absorbent of HC and CO, in addition to the zeolite catalyst and the collecting apparatus that collects the exhaust gas. Consequently, the structure of the exhaust gas purifying apparatus becomes complex, and it takes time and labor to manufacture and maintain the apparatus.

SUMMARY OF THE INVENTION

It is an object of the present invention to provide an exhaust gas purifying method and an exhaust gas purifying apparatus that restrict the discharging of harmful components when the catalytic converter is not sufficiently warmed up immediately after the starting of the internal combustion engine, by using means other than the absorbent or the like. It is also an object of the present invention to provide an exhaust gas collecting apparatus that can be suitably used for the method and the apparatus.

In order to achieve the above objects, according to the present invention, an exhaust gas purifying method for purifying exhaust gas from an internal combustion engine by using a catalytic converter comprises a process of collecting at least a part of the exhaust gas discharged from the internal combustion engine into a collection vessel during a period from a starting time of the internal combustion engine to satisfaction of a predetermined collection terminating condition; and a process of recirculating the exhaust gas collected in the collection vessel to an upstream side from the catalytic converter According to the exhaust gas purifying method of the present invention, the collection vessel collects exhaust gas from the starting of the internal combustion engine. Therefore, it is possible to restrict the discharging of harmful substances of the exhaust gas into the atmosphere immediately after the starting of the internal combustion engine without adsorbing the harmful substances with an absorbent or the like.

According to the exhaust gas purifying method of the invention, the collection terminating condition may include that an activation state of the catalytic converter has reached a predetermined level. Alternatively, the collection terminating condition may include that a collection state of the exhaust gas into the collection vessel has reached a predetermined limit.

The exhaust gas purifying method may be such that the recirculating of the exhaust gas from the collection vessel is prohibited at the time of starting the collection of the exhaust gas into the collection vessel, and the prohibition of the recirculating is cancelled when a predetermined recirculating permission condition has been satisfied. With this arrangement, the exhaust gas discharged from the internal combustion engine within a predetermined period of time after starting the internal combustion engine is introduced into-the collection vessel and is held there. Therefore, it is possible to effectively delay the timing of returning the collected exhaust gas to the exhaust passage, and proceed with the warm-up of the catalytic converter during this period.

The recirculating of the exhaust gas from the collection vessel may be started after an activation state of the catalytic converter has reached the predetermined level. With this arrangement, it is possible to securely purify the harmful substances generated at an initial stage after the starting of the internal combustion engine, by using the catalytic converter that is activated to a predetermined level.

The exhaust gas purifying method of the present invention may further comprise a process of stopping the collection of the exhaust gas into the collection vessel when the collection terminating condition has been satisfied. With this arrangement, it is possible to prevent the collection of surplus exhaust gas into the collection vessel, and there is no risk of an unnecessary increase in the load of processing the collected exhaust gas.

The exhaust gas purifying method of the present invention may collect exhaust gas passing through the catalytic converter, into the collection vessel. As the exhaust gas once passes through the catalytic converter, it is possible to sufficiently utilize the effect of warming up the catalytic converter based on a reaction of unburned substances with the catalytic converter On the other hand, the exhaust gas may be introduced into the collection vessel from the exhaust passage at a position upstream from the catalytic converter. In this case, based on the collection, it is possible to limit the quantity of the exhaust gas that is introduced to the catalytic converter. Therefore, it is possible to suppress a reduction in the temperature of the catalytic converter attributable to a passing of a large quantity of exhaust gas in a state that the catalytic converter is insufficiently activated. When the exhaust gas is introduced into the collection vessel at the position upstream from the catalytic converter, it is not possible to expect the effect of promoting the warm up of the catalytic converter based on a supply of unburned substances. In this case, the exhaust gas purifying method may further comprise a process of heating the catalytic converter with a heating device, in parallel with the collection of the exhaust gas into the collection vessel. When the exhaust gas is introduced into the collection vessel at the position up stream from the catalytic converter, in the collection process, a part of the exhaust gas may be introduced to the catalytic converter, and the remaining exhaust gas may be collected into the collection vessel. With this arrangement, it is possible to introduce the exhaust gas to the catalytic converter by a quantity that is necessary to warm up the catalytic converter thereby to promote the warm up of the catalytic converter, and collect surplus exhaust gas into the collection vessel thereby to prevent the aggravation of the performance of purifying the exhaust gas.

The exhaust gas purifying method of the present invention may be such that, in the collection process, a total quantity of the exhaust gas is collected into the collection vessel. In this case, during a predetermined period of time from the starting of the internal combustion engine, there is no risk of discharging exhaust gas that contains harmful substances into the atmosphere, and the purifying characteristics of the exhaust gas is maximally improved.

In the recirculating process, the exhaust gas may be recirculated to the intake passage, or the exhaust gas is recirculated to the exhaust passage at a position upstream from the catalytic converter. When the exhaust gas is recirculated to the intake passage, it is possible to make the internal combustion engine combust the unburned substances contained in the exhaust gas like the exhaust gas recirculation (EGR) apparatus, to restrict the discharge quantity of the unburned substances. On the other hand, when the exhaust gas is recirculated to the exhaust passage in this way, the influence that the collected exhaust gas gives to an operation state of the internal combustion engine (for example, a variation of an air-fuel ratio) becomes smaller than that when the exhaust gas is recirculated to the intake passage. Consequently, the restriction applied to the recirculating of the exhaust gas is relaxed.

When exhaust gas is recirculated to the intake passage, it is possible to take out the exhaust gas from the collection vessel by utilizing a negative pressure that is generated in the intake passage. However, when exhaust gas is recirculated to the exhaust passage, a negative pressure is not obtained. When exhaust gas is recirculated to the exhaust passage, pressure may be applied to the exhaust gas in the collection vessel, thereby to return the exhaust gas to the exhaust passage. It is possible to apply the pressure with pressure application device such as a pump or a compressor.

In the exhaust gas purifying method of the present invention, the exhaust gas may be compressed and collected into the collection vessel in the collection process. By compressing the exhaust gas, it is possible to reduce a necessary volume of the collection vessel, and relax the constraint applied to the mounting of the collection vessel onto a vehicle.

According to the present invention, an exhaust gas purifying apparatus that purifies exhaust gas from an internal combustion engine by using a catalytic converter comprises: a collection vessel that can hold exhaust gas; an exhaust gas taking-out passage through which exhaust gas is introduced from an exhaust passage of the internal combustion engine to the collection vessel; an exhaust gas introduction passage through which the exhaust gas is introduced from the collection vessel to an upstream side from the catalytic converter; a first valve device that is switchable between a position where the introduction of the exhaust gas from the exhaust passage to the exhaust gas taking-out passage is permitted and a position where the introduction of the exhaust gas is prevented; a second valve device that is switchable between a position where the introduction of the exhaust gas to the upstream side from the catalytic converter through the exhaust gas introduction passage is permitted and a position where the introduction of the exhaust gas is prevented; and a valve control device that controls the first valve device such that at least a part of the exhaust gas discharged from the internal combustion engine is collected into the collection vessel through the exhaust gas taking-out passage during a period from a starting time of the internal combustion engine to satisfaction of a predetermined collection terminating condition.

The exhaust gas purifying apparatus of the present invention collects at least a part of the exhaust gas discharged from the internal combustion engine into the collection vessel during a predetermined period since a starting time of the internal combustion engine, when the valve control device controls the first valve device. It is possible to return the exhaust gas collected in the collection vessel to the upstream side from the catalytic converter when the second valve device is operated. With the above arrangement, it is possible to carry out the exhaust gas purifying method according to the present invention.

In order to carry out preferred embodiments of the exhaust gas purifying method according to the above embodiments of the present invention, the internal combustion engine according to the present invention can include the following embodiments.

The exhaust gas purifying apparatus may be such that the collection terminating condition includes that an activation state of the catalytic converter has reached a predetermined level. The exhaust gas purifying apparatus may be such that the collection terminating condition includes that a state of collecting the exhaust gas into the collection vessel has reached a predetermined limit. The valve control device may control the second valve device so as to prohibit the recirculating of the exhaust gas from the collection vessel at the time of starting the collection of the exhaust gas into the collection vessel, and cancel the prohibition of the recirculating when a predetermined recirculating permission condition has been satisfied. The valve control device may control the second valve device so as to start the recirculating of the exhaust gas from the collection vessel after the activation state of the catalytic converter has reached the predetermined level. The valve control device may control the first valve device so as to stop the collection of the exhaust gas into the collection vessel when the collection terminating condition has been satisfied. The exhaust gas taking-out passage may be branched from the exhaust passage at a position downstream from the catalytic converter. The exhaust gas taking-out passage may be branched from exhaust passage at a position upstream from the catalytic converter. The exhaust gas purifying apparatus may comprise a heating device that heats the catalytic converter and a heating control device that causes the heating device to perform hating in parallel with the collection of the exhaust gas into the collection vessel. The first valve device of the exhaust gas purifying apparatus may be switchable to a position where a part of the exhaust gas is introduced to the catalytic converter, and the remaining exhaust gas is introduced to the exhaust gas taking-out passage. The first valve device of the exhaust gas purifying apparatus may be switchable to a position where a total quantity of the exhaust gas is introduced to the exhaust gas taking-out passage. The exhaust gas introduction passage may be connected to the intake passage. The exhaust gas introduction passage may be connected to the exhaust passage at a position upstream from the catalytic converter. The exhaust gas purifying apparatus may further comprise a pressurizing device that applies pressure to the exhaust gas within the collection vessel to feed the exhaust gas to the exhaust passage. The exhaust gas purifying apparatus may further comprise a compressing device that compresses the exhaust gas to feed the exhaust gas into the collection vessel.

Further, the exhaust gas purifying apparatus of the present invention may be such that the collection vessel of the exhaust gas purifying apparatus is formed in a shape of a bag whose volume is variable. In this case, when the collection of exhaust gas is not necessary or when the collection quantity is small, it is possible to make small the collection vessel. Therefore, it is possible to relax the constraint of mounting the collection vessel onto a vehicle.

In order to achieve the above objects, an exhaust gas collecting apparatus of an internal combustion engine according to the present invention, comprises: a collection vessel that can hold exhaust gas discharged from the internal combustion engine; an exhaust gas taking-out passage through which exhaust gas is introduced from an exhaust passage of the internal combustion engine to the collection vessel; an exhaust gas introduction passage through which the exhaust gas is introduced from the collection vessel to the exhaust passage at a position upstream from the catalytic converter; a first valve device that is switchable between a position where the introduction of the exhaust gas from the exhaust passage to the exhaust gas taking-out passage is permitted and a position where the introduction of the exhaust gas is prevented; and a second valve device that is switchable between a position where the introduction of the exhaust gas from the exhaust gas introduction passage to the exhaust passage is permitted and a position where the introduction of the exhaust gas is prevented. Based on the operation of the first valve device and the second valve device of the exhaust gas collecting apparatus, it is possible to carry out the exhaust gas purifying method of the present invention.

The exhaust gas collecting apparatus of the present invention includes the following preferred embodiments like the exhaust gas purifying apparatus according to the present invention.

That is to say, the exhaust gas collecting apparatus may be such that the exhaust gas taking-out passage is branched from the exhaust passage at a position downstream from the catalytic converter. The exhaust gas taking-out passage may be branched from the exhaust passage at a position upstream from the catalytic converter. The first valve device may be switchable to a position where a part of the exhaust gas is introduced to the catalytic converter, and the remaining exhaust gas may be introduced to the exhaust gas taking-out passage. The first valve device may be switchable to a position where a total quantity of the exhaust gas is introduced to the exhaust gas taking-out passage. The exhaust gas collecting apparatus may further comprise a pressurizing device that applies pressure to the exhaust gas within the collection vessel to feed the exhaust gas to the exhaust passage. The exhaust gas collecting apparatus may further comprise a compressing device that compresses the exhaust gas to feed the exhaust gas into the collection vessel. The collection vessel can be deformed according to a quantity of collected exhaust gas.

DESCRIPTION OF THE PREFERRED EMBODIMENTS (First Embodiment)

Figure 1:
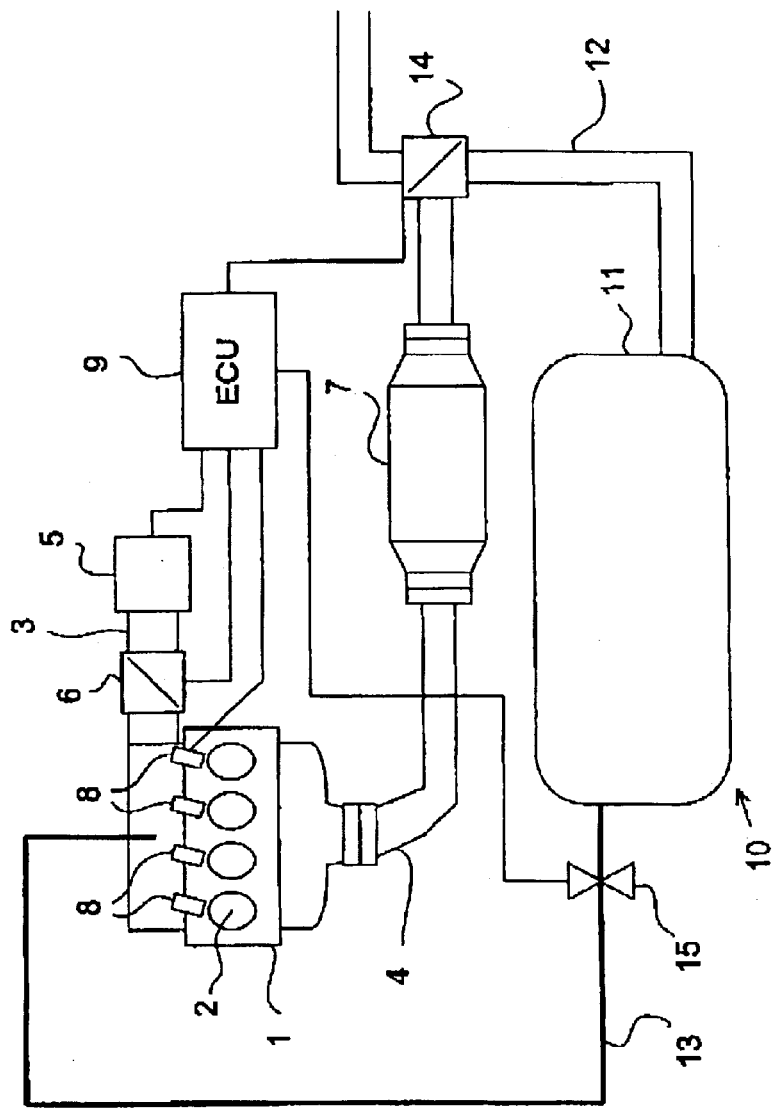
FIG. 1 is a view showing a structure of an exhaust gas purifying apparatus according to a first embodiment of the present invention.

FIG. 1 shows a structure of an exhaust gas purifying apparatus according to a first embodiment of the present invention. In FIG. 1, an internal combustion engine 1 is structured as a four-cylinder engine that has four cylinders 2, . . . , and 2 disposed in-line. As is well known in the art, the internal combustion engine has an intake passage 3 and an exhaust passage 4 connected thereto. The intake passage 3 is provided with an air filter 5 that filters an intake gas, and a throttle valve 6 for adjusting an intake quantity. The exhaust passage 4 is provided with a three-way catalytic converter 7 that purifies the exhaust gas. The internal combustion engine 1 is provided with injectors (i.e., fuel injection valves) 8, . . . , and 8, corresponding to the cylinders 2. The injectors 8 may be provided to jet fuel to the intake passage 3, or may be provided to jet fuel into the cylinders 2. The internal combustion engine 1 may be of a spark ignition type or a self-ignition type.

An engine control unit (ECU) 9 controls an operation state of the internal combustion engine 1. The ECU 9 is structured as a computer that is a combination of a microprocessor, a ROM and a RAM as main storage devices and the like. The ECU 9 executes various kinds of processing that are necessary to control the operation state of the internal combustion engine 1, and operation controls of various kinds of devices, by referring output signals from various sensors. As sensors that are connected to the ECU 9, there are an airflow meter that outputs a signal corresponding to an intake air quantity, and an $O_2$ sensor that outputs a signal corresponding to a quantity of oxygen contained in the exhaust gas. The ECU 9 also controls the operation of the injectors 8 and the like.

In order to reduce a discharge quantity of harmful substances at the starting time of the internal combustion engine 1, the internal combustion engine 1 has an exhaust gas collecting apparatus 10. The exhaust gas collecting apparatus 10 comprises a collection vessel 11 in which a predetermined quantity of exhaust gas can be stored, an exhaust gas taking-out passage 12 that connects between the collection vessel 11 and the exhaust passage 4, an exhaust gas introduction passage 13 through which the exhaust gas is recirculated from the collection vessel 11 to the internal combustion engine 1, a switching valve 14 as a first valve device that is provided at a position of a connection between the exhaust gas taking-out passage 12 and the intake passage 3, and an open/close valve 15 as a second valve device that opens and closes the exhaust gas introduction passage 13.

Figure 2A:
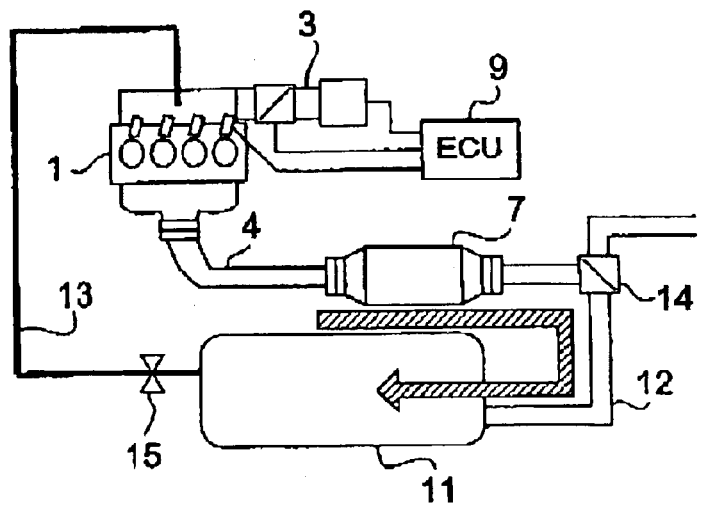
FIGS. 2A to 2C are views showing exhaust gas flow paths in the exhaust gas purifying apparatus shown in FIG. 1.
Figure 2B:
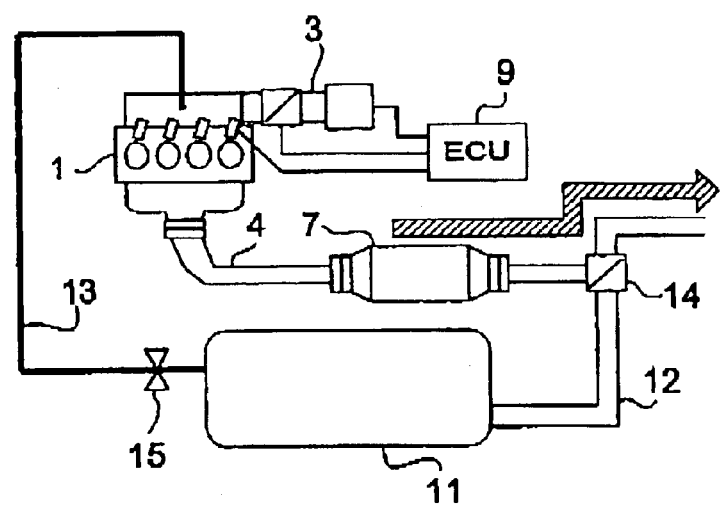

The exhaust gas taking-out passage 12 is branched from exhaust passage 4 at a position downstream from the catalytic converter 7. The switching valve 14 is switchable between an exhaust gas discharging position where the exhaust gas passing through the catalytic converter 7 is introduced to the exhaust passage 4 further downstream from the switching valve 14 as shown in FIG. 2B and an exhaust gas collection position where the exhaust gas is introduced to the exhaust gas taking-out passage 12 as shown in FIG. 2A. At the exhaust gas collecting position, the switching valve 14 may introduce a total quantity of the exhaust gas to the exhaust gas taking-out passage 12, or may permit a part of the exhaust gas to pass to a downstream position of the exhaust passage 4 and introduce the remaining exhaust gas to the exhaust gas taking-out passage 12.

The collection vessel 11 has a volume corresponding to a total exhaust gas quantity of the exhaust gas from a starting time of the internal combustion engine 1 to the reaching of the activation state of the catalytic converter 7 to a predetermined level. The collection vessel 11 may be structured as a volume invariable rigid vessel such as a metal box, or may be structured as a volume variable bag. The exhaust gas taking-out passage 12 and the exhaust gas introduction passage 13 may be pipes that are structured by using a rigid body such as metal, or may be flexible tubes.

Figure 2C:
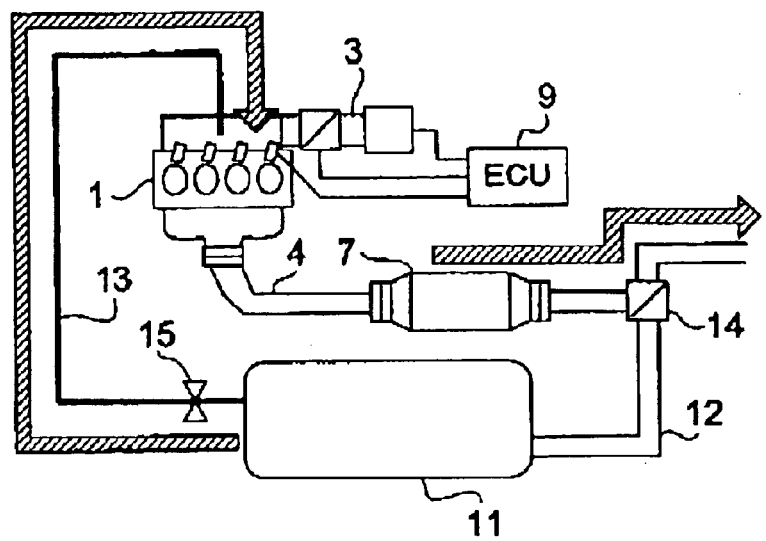

As shown in FIG. 1, the exhaust gas introduction passage 13 is connected to the intake passage 3 of the internal combustion engine 1. When the open/close valve 15 is opened, the exhaust gas that is stored in the collection vessel 11 is introduced into the exhaust passage 3, as shown in FIG. 2C.

Figure 3:
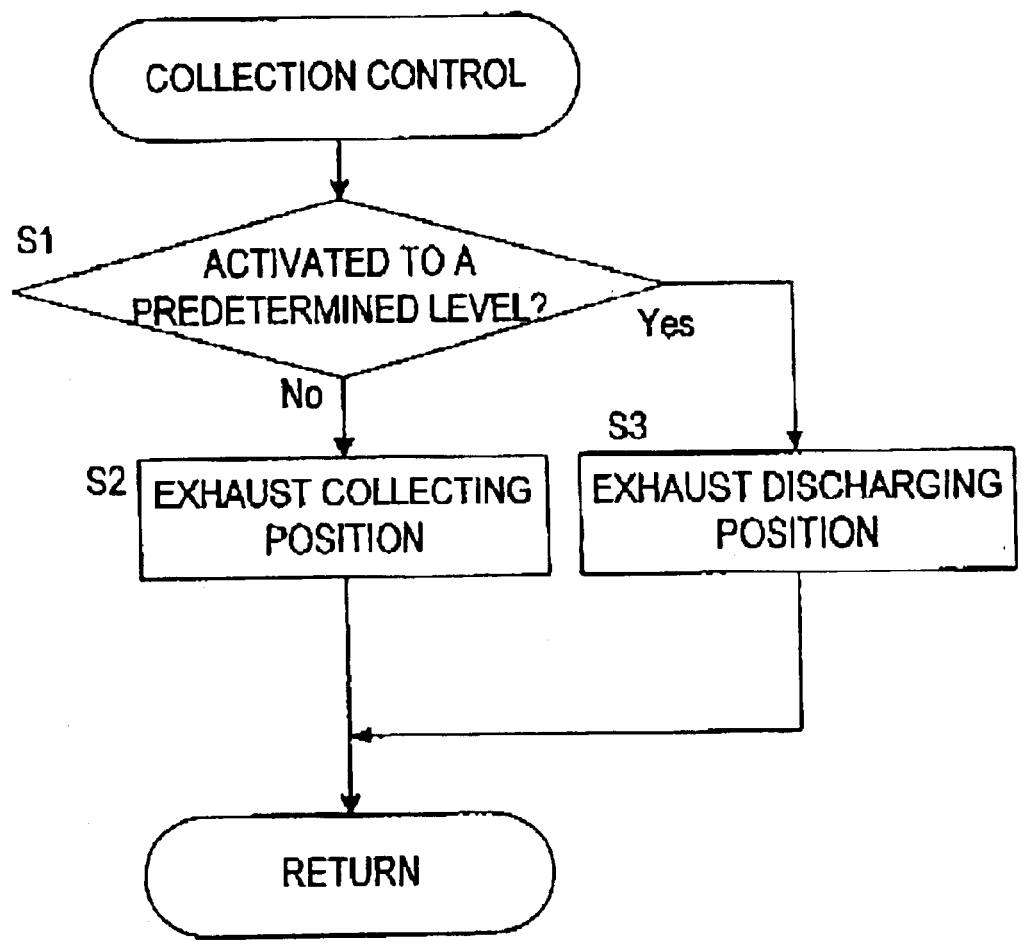
FIG. 3 is a flowchart showing a procedure of a collection control processing that the engine control unit (ECU) shown in FIG. 1 executes.
Figure 4:
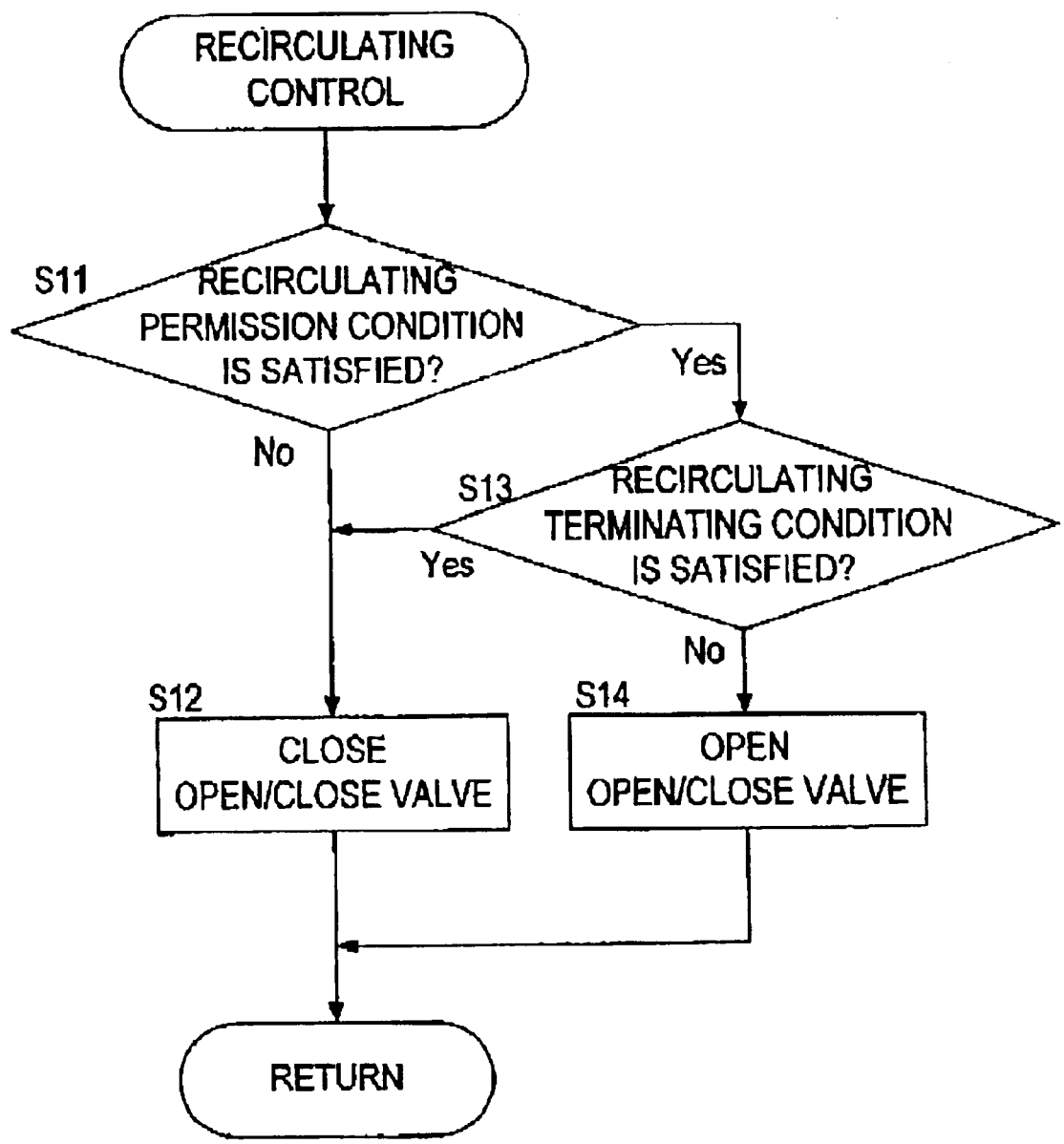
FIG. 4 is a flowchart showing a procedure of a recirculating control processing that the ECU executes.

The ECU 9 controls the operation of the switching valve 14 and the open/close valve 15. FIG. 3 and FIG. 4 are flowcharts that show a collection control routine and a recirculating control routine respectively that the ECU 9 executes to switch control the switching valve 14 and the open/close valve 15 according to the activation state of the catalytic converter. The ECU 9 starts processing these routines at a point of time when the ignition switch of a vehicle is turned on (hereinafter referred to as IG ON), and thereafter, executes the routines repeatedly at every predetermined period (for example, one second).

In the collection control processing shown in FIG. 3, the ECU 9 first decides at step S1 whether the activation state of the catalytic converter 7 has reached a predetermined level. When the ECU 9 decides that the activation state of the catalytic converter 7 has not reached a predetermined level, the ECU 9 switches the switching valve 14 to the exhaust gas collecting position shown in FIG. 2A at step S2. When the ECU 9 decides that the activation state of the catalytic converter 7 has reached a predetermined level, the ECU 9 switches the switching valve 14 to the exhaust gas discharging position shown in FIG. 2B at step S3. Thereafter, the ECU 9 ends the collection control.

In the recirculating control processing shown in FIG. 4, the ECU 9 decides at step S11 whether a predetermined recirculating permission condition is satisfied. The recirculating permission condition includes that the activation state of the catalytic converter 7 has reached a predetermined level. When the recirculating permission condition is not satisfied, the ECU 9 closes the open/close valve 15 at step S12, and ends the processing. On the other hand, when the recirculating permission condition is satisfied, the process proceeds to step S13, and the ECU 9 decides whether a predetermined recirculating terminating condition is satisfied. The recirculating terminating condition includes that a sufficient quantity of exhaust gas has been recirculated from the collection vessel 11.

When a decision is made that the recirculating terminating condition is satisfied at step S13, the process proceeds to step S12, and the ECU 9 closes the open/close valve 15. When the recirculating terminating condition is not satisfied, the ECU 9 opens the open/close valve 15 at step S14, and ends the processing. When the open/close valve 15 is opened, the exhaust gas is returned from the collection vessel 11 to the intake passage 3, as shown in FIG. 2C. The returned exhaust gas is introduced to the catalytic converter 7, which purifies the exhaust gas.

According to the above processing, a total quantity or a part of the exhaust gas discharged to the exhaust passage 4 is collected into the collection vessel 11 until when the activation state of the catalytic converter 7 has reached a predetermined level. After the activation has reached a predetermined level, the total quantity of the exhaust gas is discharged to the atmosphere. Therefore, it is possible to reduce the quantity of harmful components that are discharged to the atmosphere at a stage when the catalytic converter 7 is not sufficiently activated. Consequently, it becomes possible to improve the exhaust gas purification performance at the cold start time.

The recirculating permission condition is not satisfied and the open/close valve 15 is kept closed, until when the catalytic converter 7 is activated to a predetermined level. Therefore, the exhaust gas is held in the collection vessel 11. After the catalytic converter 7 is activated to a predetermined level, the open/close valve 15 is opened, and the exhaust gas held in the collection vessel 11 is recirculated to the intake passage 3. Therefore, it is possible to introduce the harmful substances that passed through the catalytic converter 7 before the catalytic converter 7 is activated, again to the catalytic converter 7 after the activation, and purifies the exhaust gas.

In the above processing, the activation level of the catalytic converter 7 that is referred to in the decision at step S1 is set to a level at which it is possible to sufficiently purify the exhaust gas when the total quantity of the exhaust gas is introduced to the catalytic converter 7. The predetermined level for satisfying the recirculating permission condition at step S11 may be set to the same level as that at step S1, or maybe set to a different level. It is possible to decide whether the catalytic converter 7 is activated to a predetermined level, based on various kinds of parameters that are related to the activation state of the catalytic converter 7. For example, it is possible to decide whether the catalytic converter 7 is activated to a predetermined level, by monitoring a temperature of the coolant of the internal combustion engine 2, a time lapsed since the starting of the internal combustion engine 1, a total intake air quantity since the starting of the internal combustion engine, a time lapsed since the last stop of the internal combustion engine 1, a temperature of the exhaust gas, a temperature of the catalytic converter, a quantity of the exhaust gas that passed through the catalytic converter, and a quantity of harmful substances such as HC, CO, NOx, etc. contained in the exhaust gas that passed through the catalytic converter. These parameters may be obtained from sensors, or estimated based on predetermined estimation logic. It is preferable to control the recirculating of exhaust gas so that a proper quantity of exhaust gas is returned, based on the operation state of the internal combustion engine 1, in a similar manner to that employed for the EGR. In place of the open/close valve 15, it is also possible to use a flow control valve of which opening can be adjusted, thereby to increase or decrease the recirculating quantity of the exhaust gas from the collection vessel 11 according to the operation state.

In the decision of the recirculating terminating condition at step S13 in FIG. 4, whether a sufficient quantity of exhaust gas is recirculated is decided based on a period of time when the open/close valve 15 is opened, or can also be decided based on an output signal from a flow meter by providing it in the exhaust gas introduction passage 13. In the collection control shown in FIG. 3, an exhaust gas collection quantity may be detected or estimated in advance, and a recirculating of the exhaust gas corresponding to this collection quantity may be set as the recirculating terminating condition. It is not always necessary to return the total quantity of the exhaust gas held in the collection vessel 11.

In the processing shown in FIG. 3, the switching valve 14 is switched to the exhaust gas collecting position shown in FIG. 2A at a point of time when the ignition switch of the internal combustion engine 1 is turned on in a state that the catalytic converter 7 is not activated to a predetermined level. However, the switching timing of the switching valve 14 is not limited to the ignition switch on time. The switching valve 14 may be switched to the exhaust gas collecting position before harmful components generated by the starting of the internal combustion engine 1 reaches the switching valve 14. Therefore, the timing of switching the switching valve 14 to the exhaust gas collecting position may be set to a cranking time when the a starter (sel-motor) of the internal combustion engine 1 is operated, a time when a driver is considered to ride on a vehicle (i.e., when the door of the driver's seat is opened, or when the seatbelt of the driver's seat is fastened) before the ignition switch is turned on, or a time when the internal combustion engine 1 stops last time. The switching valve 14 may be switched to the exhaust gas collecting position within a delay time that is a time from when the internal combustion engine is started till when the exhaust gas that contains harmful components reaches the switching valve 14.

(Second Embodiment)

An exhaust gas purifying apparatus according to a second embodiment of the present invention will be explained with reference to FIG. 5 and FIGS. 6A to 6C. In these drawings, portions identical to those in FIG. 1 and FIG. 2 are attached with like reference numerals, and their explanation will be omitted.

Figure 5:
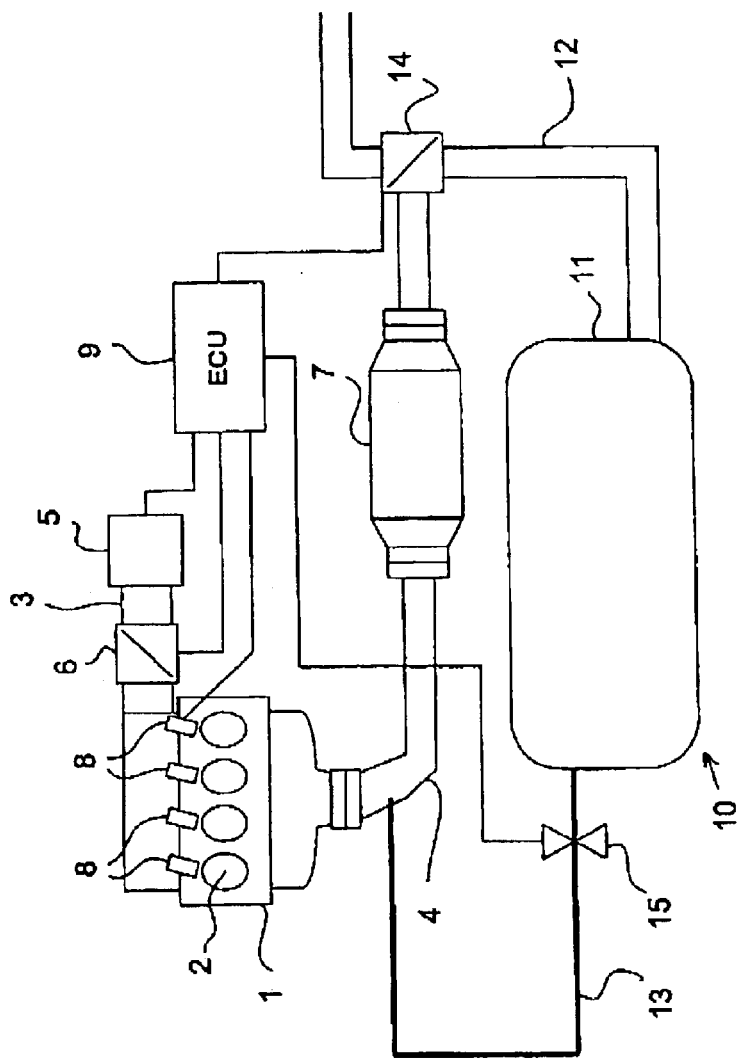
FIG. 5 is a view showing a structure of an exhaust gas purifying apparatus according to a second embodiment of the present invention.
Figure 6A:
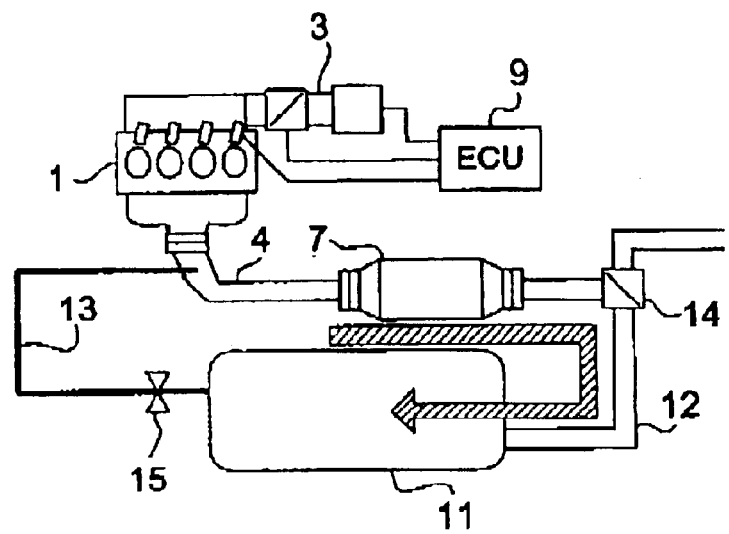
FIGS. 6A to 6C are views showing exhaust gas flow paths in the exhaust gas purifying apparatus shown in FIG. 5.
Figure 6B:
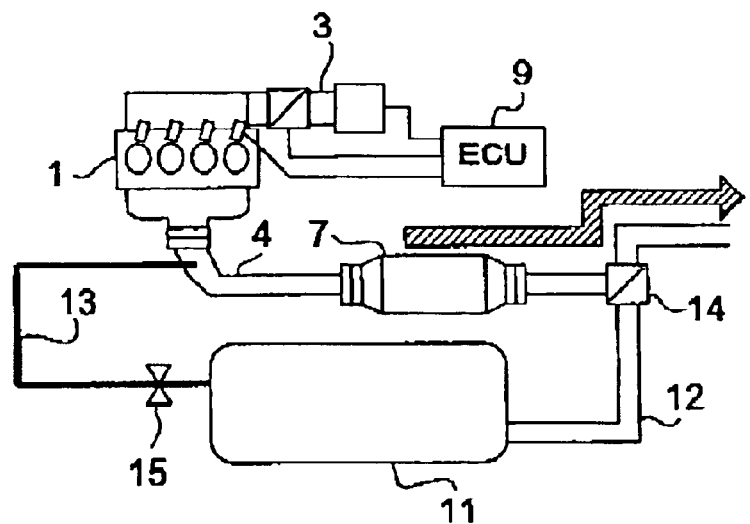
Figure 6C:
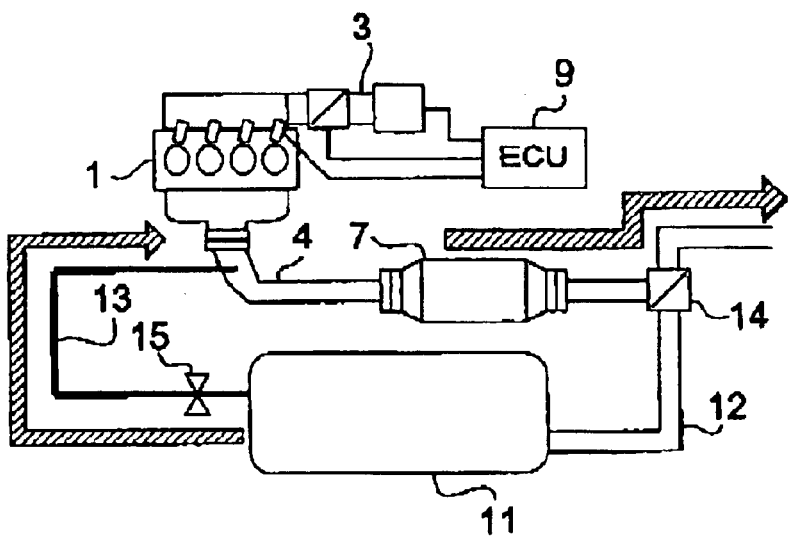

The exhaust gas purifying apparatus according to the second embodiment shown in FIG. 5 is different from the exhaust gas purifying apparatus according to the embodiment shown in FIG. 1 in that the exhaust gas introduction passage 13 is connected to the exhaust passage at a position upstream from the catalytic converter 7. Other points are similar to those shown in FIG. 1. Therefore, when the open/close valve 15 is opened, the exhaust gas held in the collection vessel 11 is introduced to the exhaust passage 4, and is supplied to the catalytic converter 7, as shown in FIG. 6C. When the exhaust gas is recirculated to the exhaust passage 4 in this way, the influence of the introduction of the exhaust gas given to the operation state of the internal combustion engine 1 (for example, a variation in the air-fuel ratio) becomes smaller than that according to the embodiment shown in FIG. 1. Consequently, there is an advantage that it is easy to control the recirculating of the exhaust gas from the collection vessel 11. In other words, there is an advantage that the restriction of the recirculating timing and the recirculating quantity of the exhaust gas from the collection vessel 11 become more relaxed than when the exhaust gas is recirculated to the intake passage 3.

In the present embodiment, it is also possible to control the switching valve 14 and the open/close valve 15 according to a processing similar to that shown in FIG. 3 and FIG. 4. In other words, it is possible to collect the exhaust gas before warm up of the catalytic converter 7 into the collection vessel 11 as shown in FIG. 6A, and it is possible to discharge the exhaust gas after warm up of the catalytic converter 7 from the exhaust passage 4 to the atmosphere as shown in FIG. 6E.

(Third Embodiment)

An exhaust gas purifying apparatus according to a third embodiment of the present invention will be explained with reference to FIG. 7 to FIG. 10. In these drawings, portions identical to those in FIG. 1 and FIG. 2 are attached with like reference numerals, and their explanation will be omitted.

Figure 7:
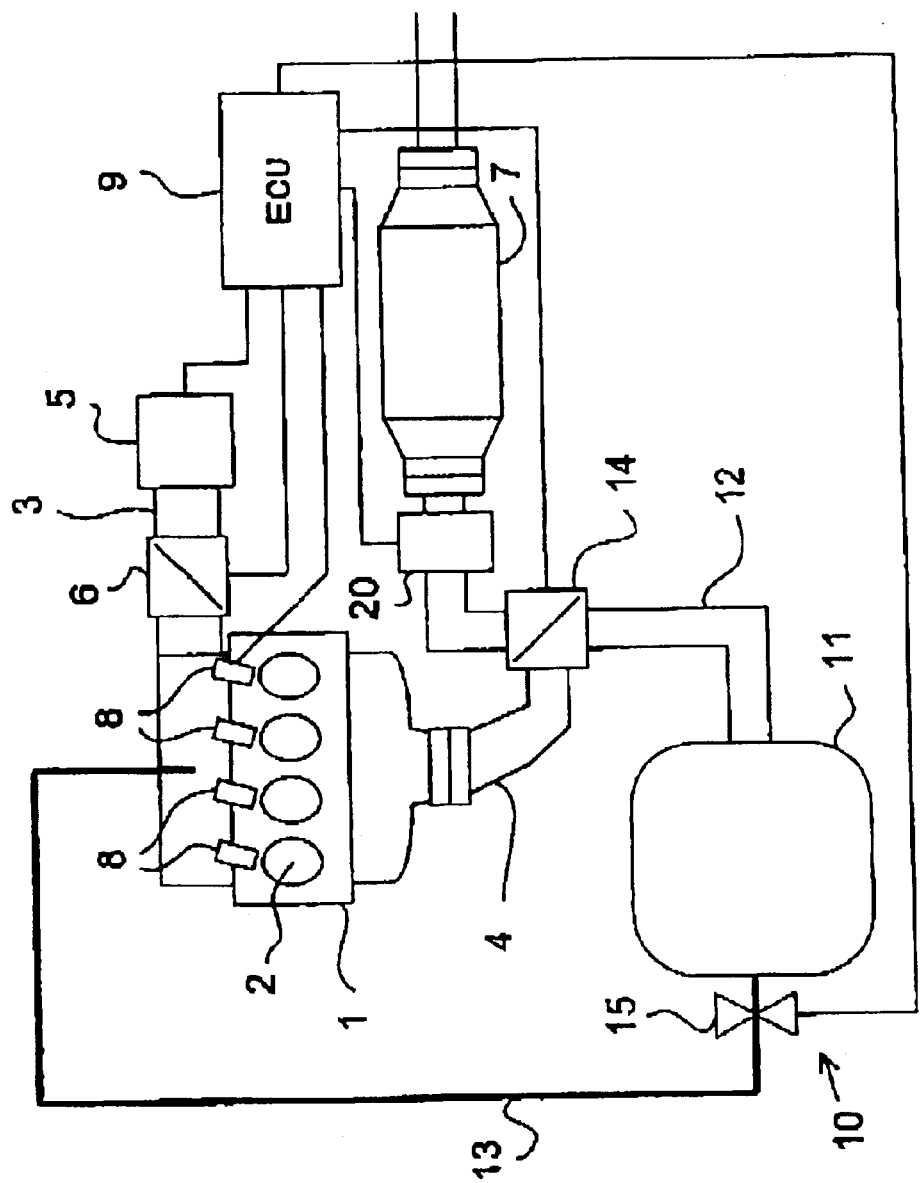
FIG. 7 is a view showing a structure of an exhaust gas purifying apparatus according to a third embodiment of the present invention.
Figure 8A:
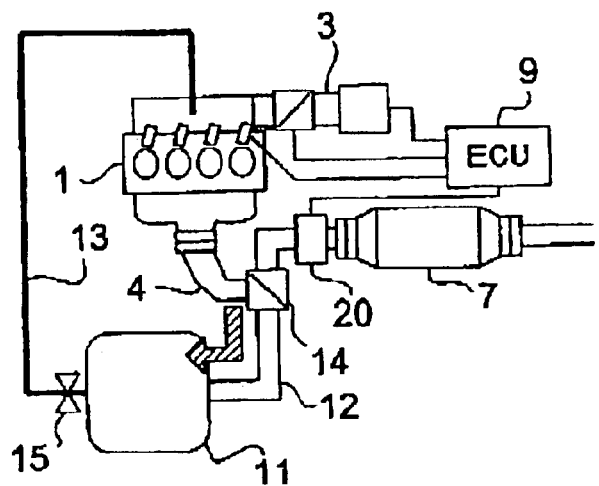
FIGS. 8A to 8C are views showing exhaust gas flow paths in the exhaust gas purifying apparatus shown in FIG. 7.
Figure 8B:
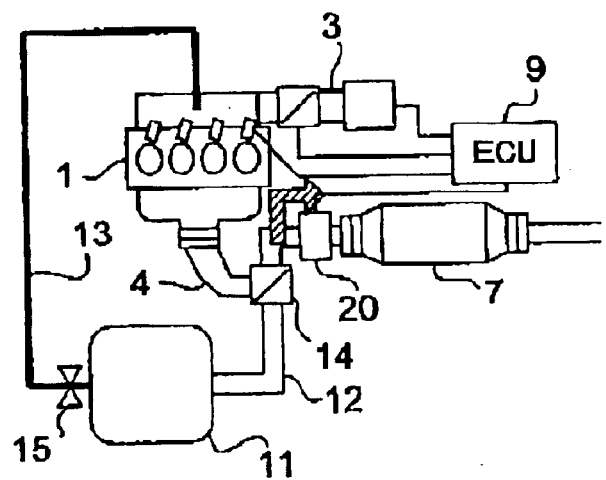

In the embodiment shown in FIG. 7, the exhaust gas taking-out passage 12 is branched from the exhaust passage 4 at a position upstream from the catalytic converter 7. The switching valve 14 is switchable between an exhaust gas discharging position where the exhaust gas is introduced to the catalytic converter 7 as shown in FIG. 8B and an exhaust gas collecting position where the exhaust gas is introduced to the exhaust gas taking-out passage 12 as shown in FIG. 8A. A heater 20 as a heating device is provided between the switching valve 14 and the catalytic converter 7. The heater 20 may be an electric heater, or a burner. When the electric heater is utilized as the heater 20, another catalytic converter separate from the catalytic converter 7 and the heater 20 may be integrated together, or the heater 20 and the catalytic converter 7 may be integrated together.

Figure 8C:
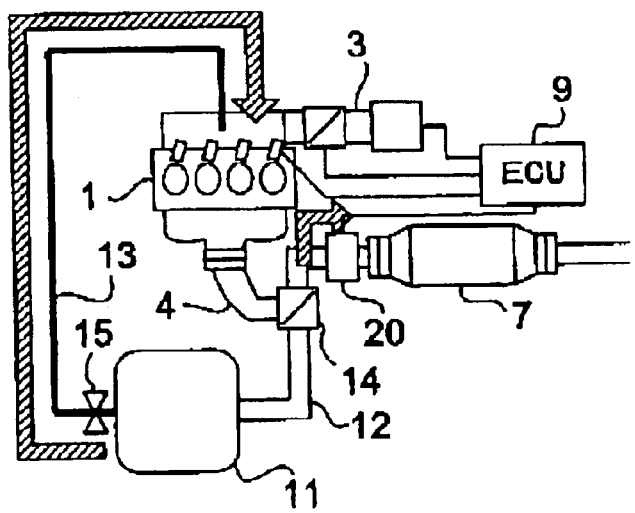
Figure 9:
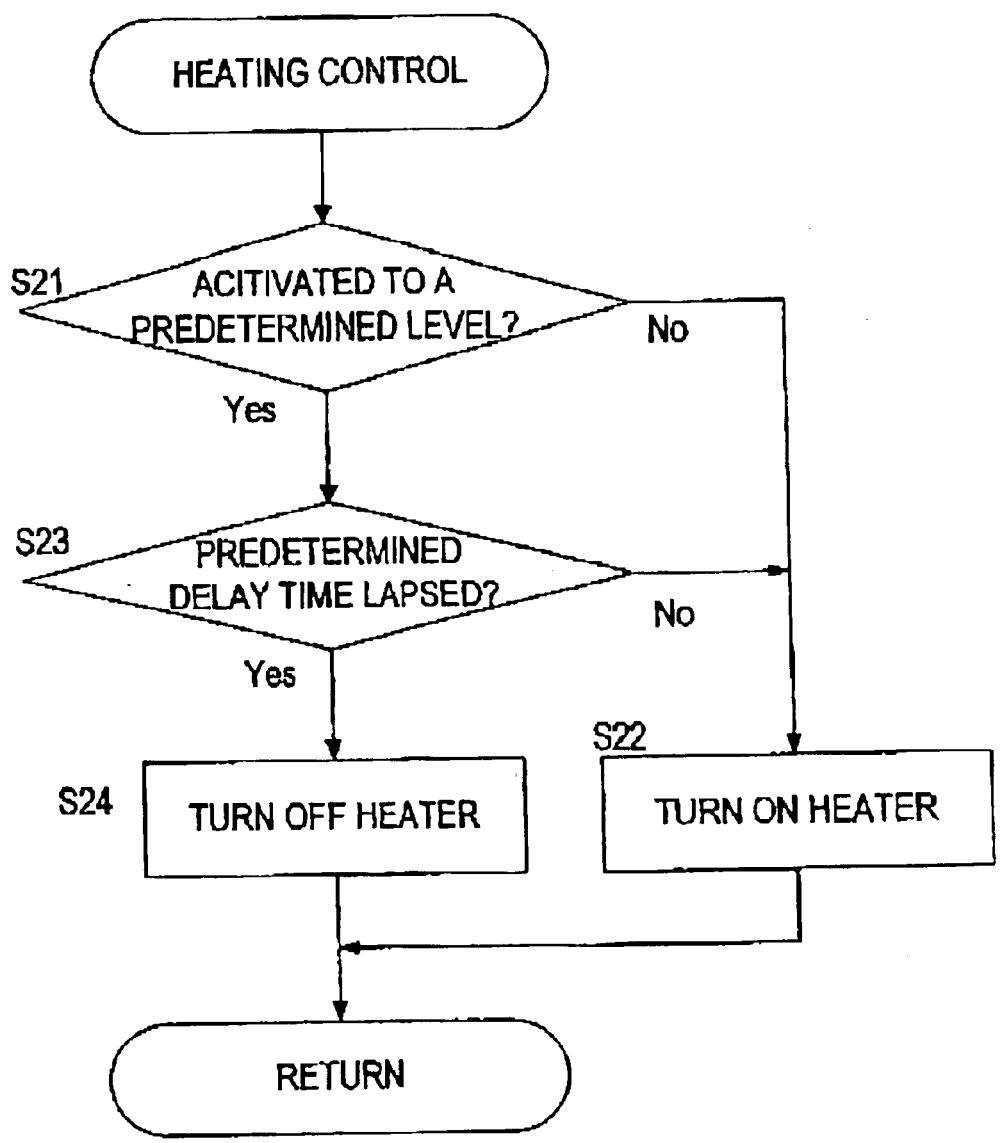
FIG. 9 is a flowchart showing a procedure of a beating control processing that the ECU executes.

In the present embodiment, the ECU 9 controls the switching of the switching valve 14 and the open/close valve 15 in a similar manner to that explained with reference to FIG. 3 and FIG. 4 A flow of the exhaust gas is switched to between flows shown in FIG. 8A to FIG. 8C by controlling the switching valve 14 and the open/close valve 15. The ECU 9 controls to turn on (i.e., heat) and turn off (i.e., stop heating) the heater 20 in relation to the activation state of the catalytic converter 7. FIG. 9 is a flowchart that shows a procedure of a heating control routine that the ECU 9 executes during a certain period after the IG ON.

In the heating control processing shown in FIG. 9, the ECU 9 first decides at step S21 whether the catalytic converter 7 is activated to a predetermined level. The decision is made in a similar manner to that explained with reference to FIG. 3 or FIG. 4. When the catalytic converter 7 is not activated to a predetermined level, the ECU 9 turns on the heater 20 at step S22, and ends the processing. On the other hand, when the catalytic converter 7 is activated to a predetermined level, the ECU 9 proceeds to step S23, and decides whether a predetermined delay time has passed after the catalytic converter 7 is activated to a predetermined level. When a predetermined delay time has not passed, the process proceeds to step S22, and the ECU 9 turns on the heater 20. When a predetermined delay time has passed, the ECU 9 turns off the heater 20 at step S24, and ends the processing. The ECU 9 turns off the heater 20 after a lapse of a predetermined delay time since the catalytic converter 7 has been activated to a predetermined level, for the following reason. That is, when the ECU 9 turns off the heater 20 immediately after the exhaust gas is introduced into the catalytic converter 7 after the switching valve 14 switches the flow of the exhaust gas from the exhaust gas collecting position to the exhaust gas discharging position, there is a risk that the exhaust gas cools the catalytic converter 7 thereby to lower the temperature of the catalytic converter 7. For a similar reason, it is preferable that the switching valve 14 gradually carries out the switching of the flow of the exhaust gas from the exhaust gas collecting position to the exhaust gas discharging position during a certain period.

Figure 10:
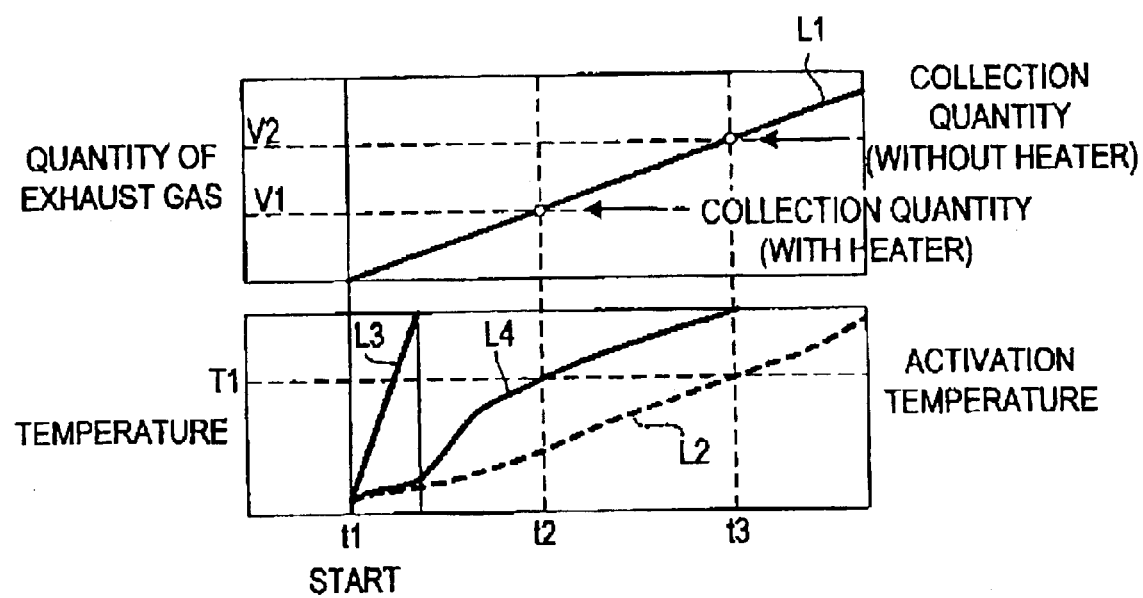
FIG. 10 is a diagram showing the quantity of exhaust gas that the collecting apparatus collects.

FIG. 10 shows a relationship between a catalytic converter temperature and an exhaust gas collection quantity, when the heater 20 heats the catalytic converter 7, and when the exhaust gas heats the catalytic converter 7 without using the heater 20, respectively. In FIG. 10, the internal combustion engine 1 is started at time t1. A total exhaust gas quantity since the starting of the internal combustion engine 1 increases proportionally along a lapse of time since the starting of the internal combustion engine 1 as shown by a straight line L1. When the heater 20 is not used to heat the catalytic converter 7, the catalytic converter temperature rises as shown by a dashed line L2. Assume that the catalytic converter 7 is heated to a temperature (i.e. an activation temperature) T1 at which the catalytic converter 7 exhibits sufficient purification performance at time t3. Then, the quantity of the exhaust gas that should be collected by the time when the catalytic converter 7 is activated is given as a total exhaust gas quantity V2 at time t3. On the other hand, when the heater 20 heats the catalytic converter 7, the heater 20 reaches a high temperature area higher than the activation temperature T1 in an extremely shorter period of time than when the catalytic converter 7 is heated, as shown by a straight line L3. As a result, the catalytic converter 7 is heated to a temperature during a short period of time as show by a line L4, and the temperature of the catalytic converter 7 reaches the activation temperature T1 at an earlier time t2 than time t3. Therefore, the quantity of the exhaust gas that should be collected until when the catalytic converter 7 is activated is a total exhaust gas quantity V1 that corresponds to time t2, which makes it possible to reduce the collection quantity.

In the present embodiment, during the period while the exhaust gas is collected as shown in FIG. 8A, a small quantity of exhaust gas may be flown to the catalytic converter 7 thereby to improve the firing performance of the catalytic converter 7 and promote the warm up of the catalytic converter 7.

(Forth Embodiment)

An exhaust gas purifying apparatus according to a fourth Embodiment of the present invention will be explained with reference to FIG. 11 and FIG. 12A to FIG. 12C. In these drawings, portions identical to those in FIG. 7 and FIG. 8A to FIG. 8C are attached with like reference numerals, and their explanation will be omitted.

Figure 11:
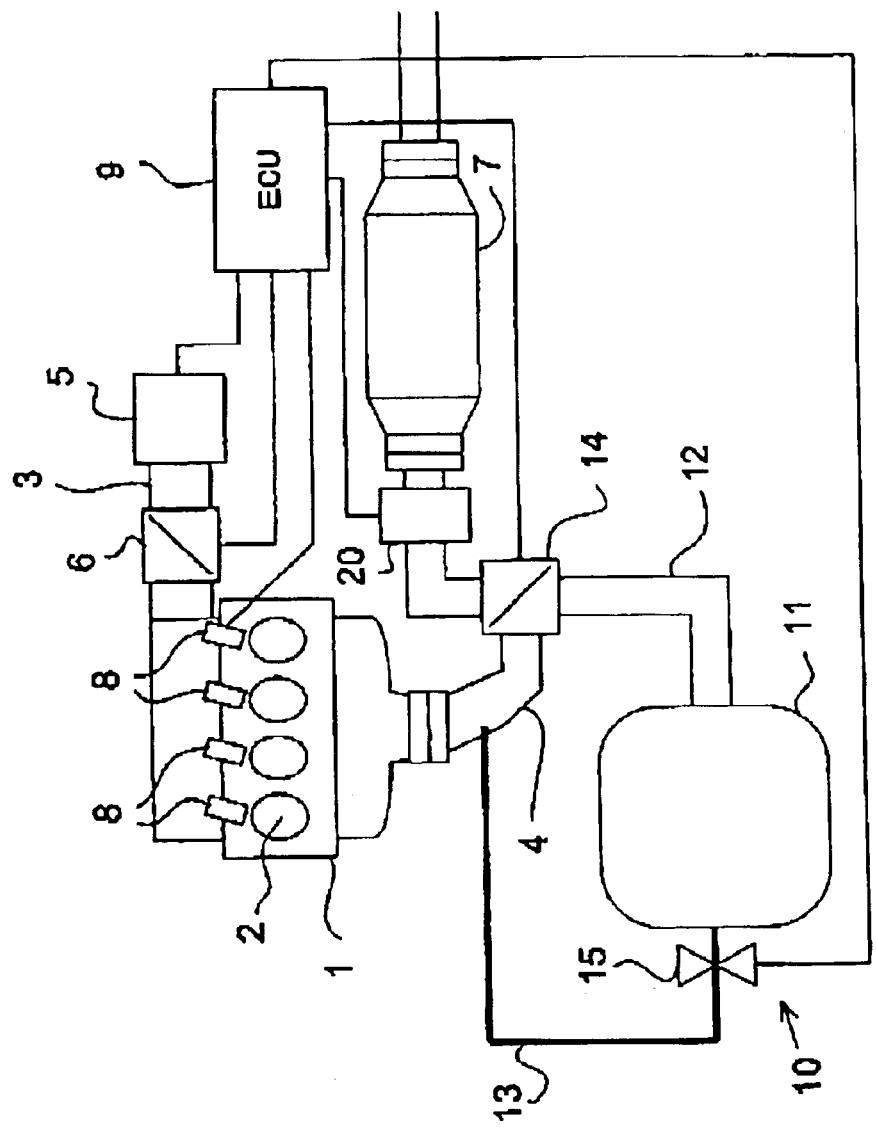
FIG. 11 is a view showing a structure of an exhaust gas purifying apparatus according to a fourth embodiment of the present invention.

The exhaust gas purifying apparatus according to the fourth embodiment shown in FIG. 11 is different from the exhaust gas purifying apparatus according to the embodiment shown in FIG. 7 in that the exhaust gas introduction passage 13 is connected to the exhaust passage at a position upstream from the catalytic converter 7. Other points are similar to those shown in FIG. 7. Therefore, when the open/close valve 15 is opened, the exhaust gas held in the collection vessel 11 is introduced to the exhaust passage 4, and is supplied to the catalytic converter 7, as shown in FIG. 12C. When the exhaust gas is recirculated to the exhaust passage 4 in this way, the influence of the introduction of the exhaust gas given to the operation state of the internal combustion engine 1 (for example, a variation in the air-fuel ratio) becomes smaller than that according to the embodiment shown in FIG. 7. Consequently, there is an advantage that it is easy to control the recirculating of the exhaust gas from the collection vessel 11. In other words, there is an advantage that the restrictions of the recirculating timing and the recirculating quantity of the exhaust gas from the collection vessel 11 become more relaxed than when the exhaust gas is recirculated to the intake passage 3.

Figure 12A:
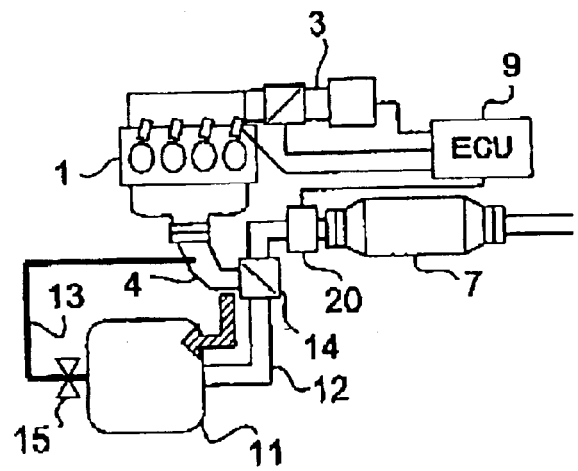
FIGS. 12A to 12C are views showing exhaust gas flow paths in the exhaust gas purifying apparatus shown in FIG. 11.
Figure 12B:
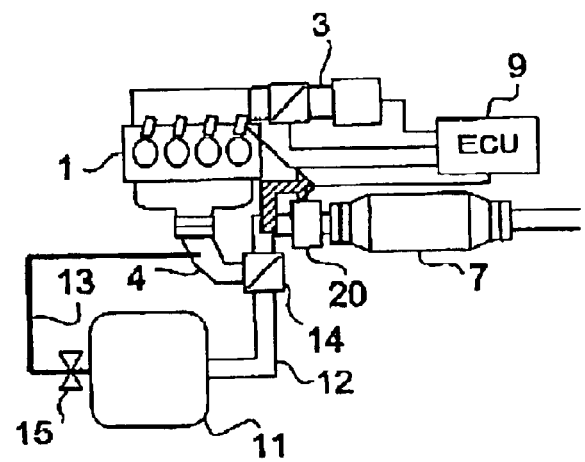
Figure 12C:
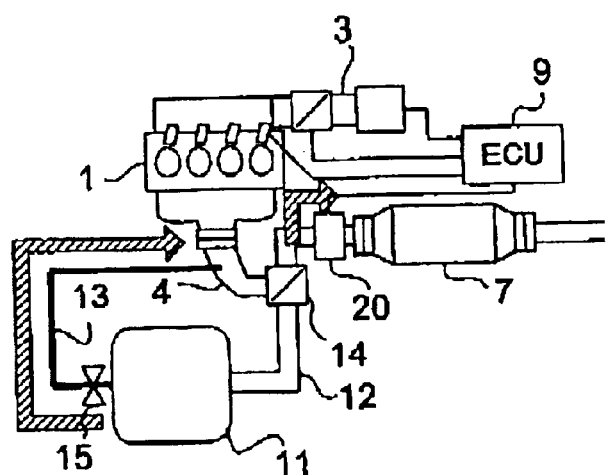

In the present embodiment, by controlling the switching valve 14, the open/close valve 15, and the heater 20 according to a processing similar to that shown in FIG. 3, FIG. 4, and FIG. 9, the exhaust gas before activation of the catalytic converter 7 is collected into the collection vessel 11 as shown in FIG. 12A, and then the exhaust gas after activation of the catalytic converter 7 is discharged from the exhaust passage 4 to the atmosphere as shown in FIG. 12B. In the embodiment shown in FIG. 11, the exhaust gas taking-out passage 12 and the exhaust gas introduction passage 13 may be shared. For example, it is possible to take out the exhaust gas from the exhaust gas taking-out passage 12 to the collection vessel 11. It is also possible to introduce the exhaust gas held in the collection vessel 11 to the exhaust passage 4 through the exhaust gas taking-out passage 12.

Figure 13A:
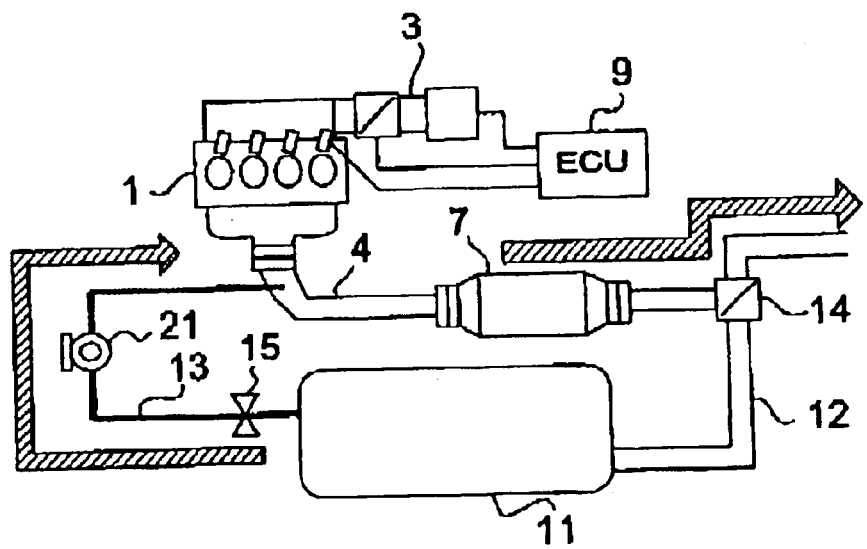
FIGS. 13A and 13B are views showing examples of a method of recirculating the collected exhaust gas.
Figure 13B:
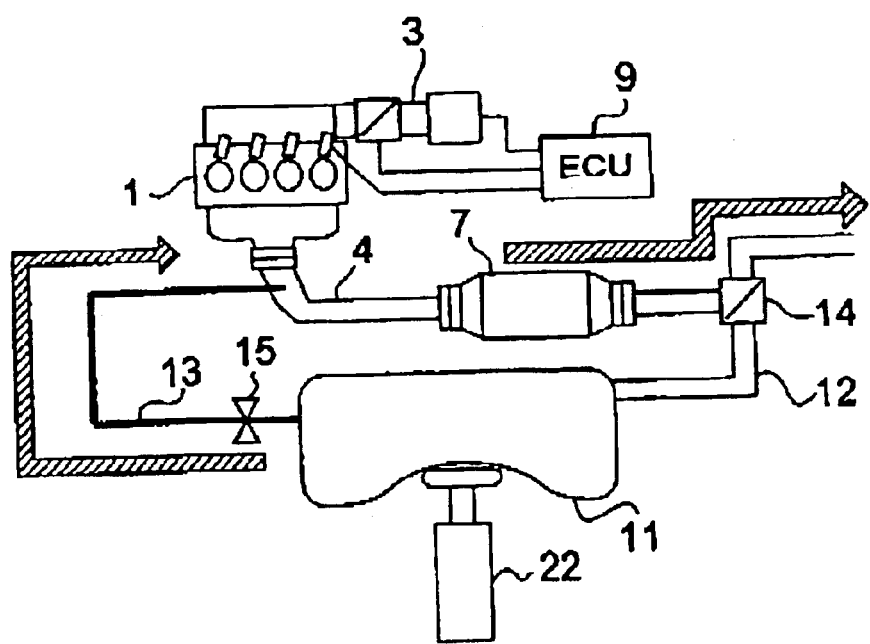

According to the first and third embodiments, it is possible to return the exhaust gas held in the collection vessel 11 to the intake passage 3, by utilizing a negative pressure that is generated in the intake passage 3. On the other hand, according to the second and fourth embodiments, as the exhaust gas is recirculated to the exhaust passage 4, a negative pressure cannot be obtained like the exhaust passage 3. Therefore, it is preferable to provide an exhaust gas feeding device that applies pressure to the exhaust gas to feed the exhaust gas to the exhaust passage 4. As the exhaust gas feeding device, a pump 21 may be provided in the exhaust gas introduction passage 13 as shown in FIG. 13A, for example. When the collection vessel 11 is structured in a bag shape that can be deformed, an actuator 22 such as a hydraulic cylinder that compresses the collection vessel 11 may be provided as the exhaust gas feeding device, as shown in FIG. 13B.

Figure 14:
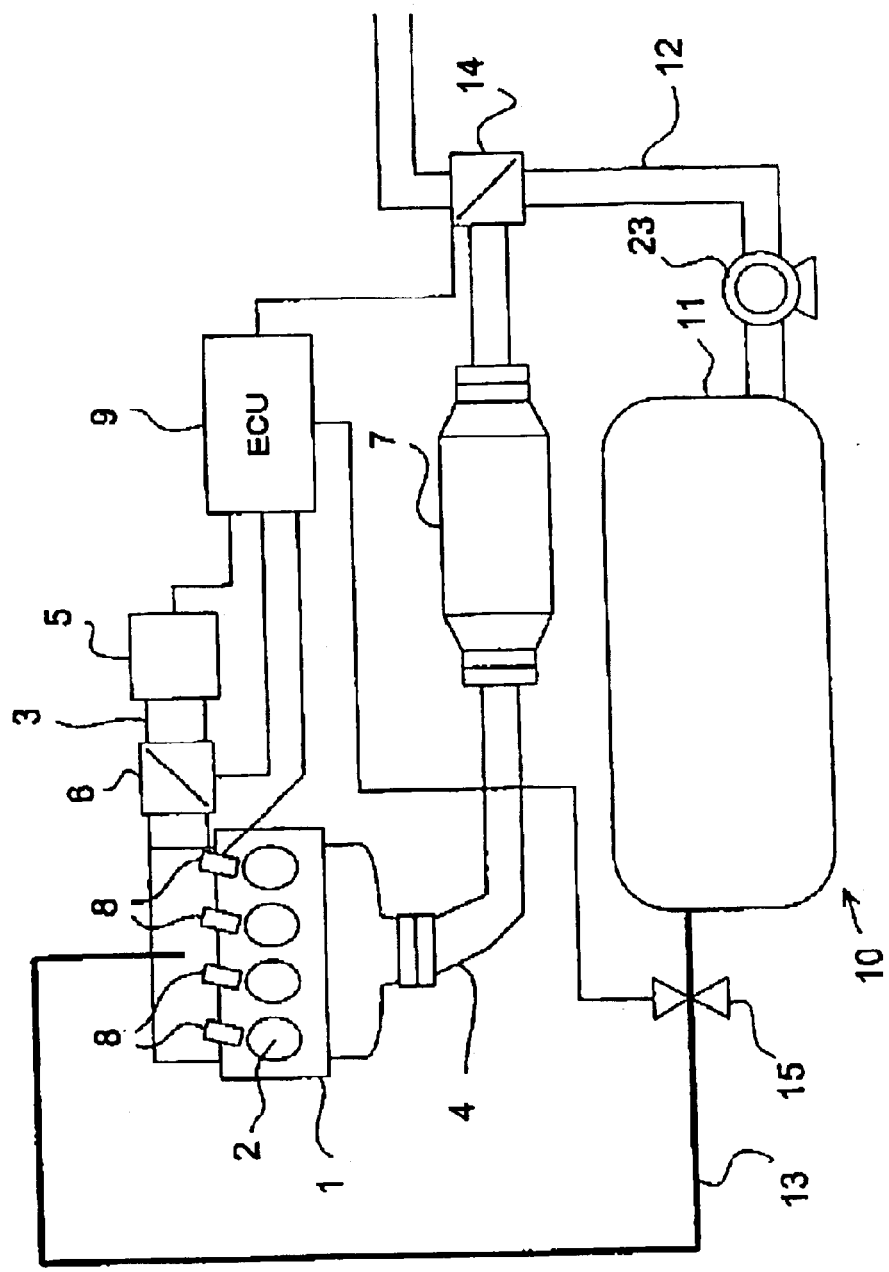
FIG. 14 is a view showing an example of a method of compressing and feeding the exhaust gas to a collection vessel.
Figure 15:
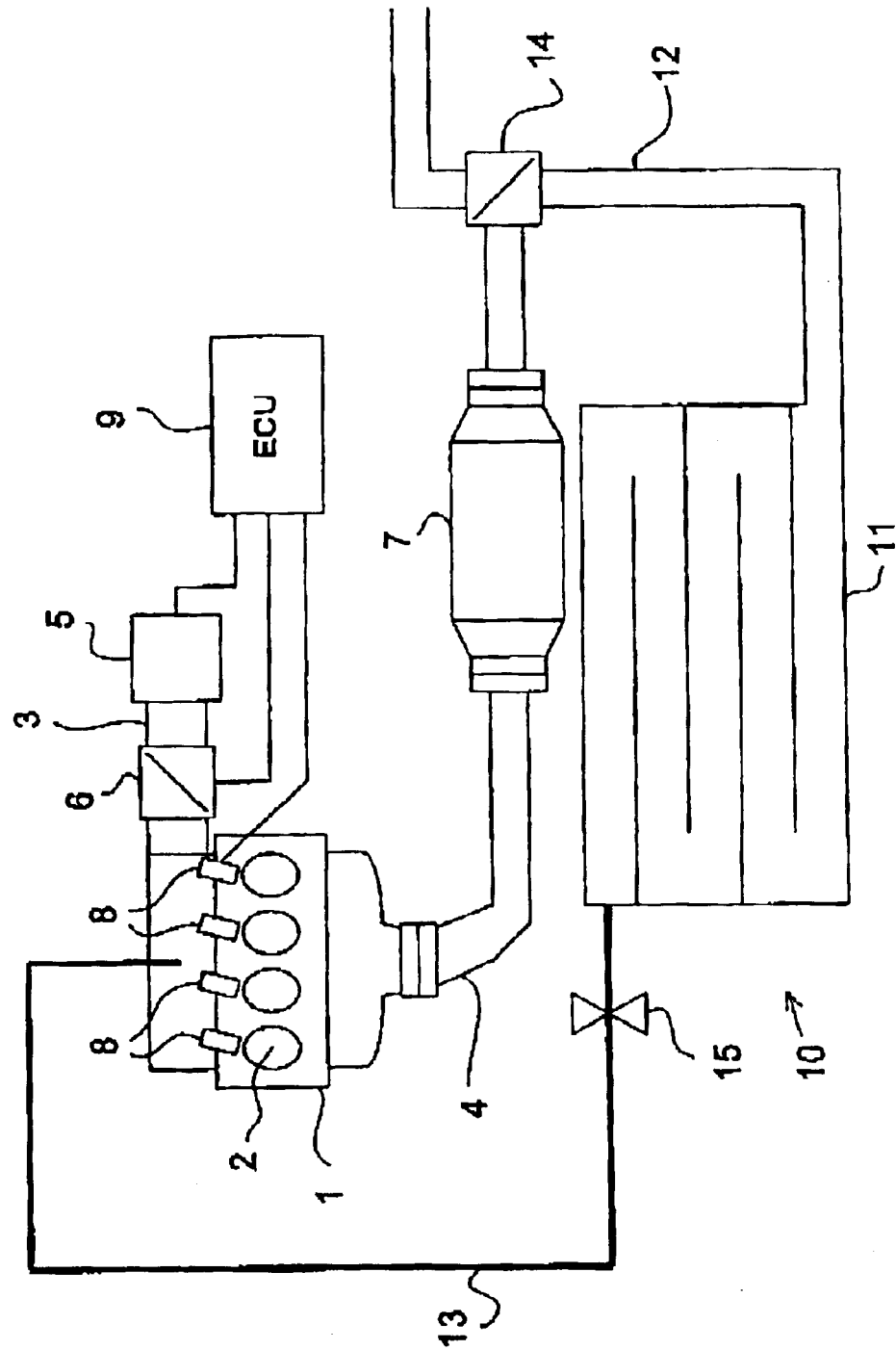
FIG. 15 is a view showing a modification of the collection vessel.

In order to facilitate the disposition of the collection vessel 11, the volume of the collection vessel 11 may be made small based on the collection of exhaust gas after compressing the exhaust gas. It is possible to compress the exhaust gas by utilizing the exhaust gas discharging pressure. It is also possible to compress the exhaust gas with a compressing device such as a pump 23 by providing this device on the exhaust gas taking-out passage 12 as shown in FIG. 14. The collection vessel 11 may have any shape so long as it has a volume capable of holding a predetermined quantity of exhaust gas. For example, it is possible to structure the collection vessel 11 capable of holding a predetermined quantity of exhaust gas by suitably disposing in winding a pipe or a tube that is similar to the exhaust gas taking-out passage 12 or the exhaust gas introduction passage 13, as shown in FIG. 15.

In the above embodiments, the ECU 9 functions as the valve control device or the heating control device. Further, in the above embodiments, that the activation state of the catalytic converter 7 reaches a predetermined level is set as the collection terminating condition. It is also possible to set that the collection state of the collection vessel 11 reaches a predetermined limit as the collection terminating condition. The predetermined limit may be set as a limit quantity of exhaust gas that the collection vessel 11 can hold. The predetermined limit may also be set as a limit of pressure (i.e., back pressure) of the exhaust passage 4 that increases when the exhaust gas is accumulated in the collection vessel 11. Whether the collection quantity of the exhaust gas has reached the limit is decided based on a total intake air quantity in the internal combustion engine 1, or a lapse time since the starting of the internal combustion engine 1, or can also be decided based on an output signal from the flow meter that is provided on the exhaust gas taking-out passage 12. Whether the back pressure of the exhaust passage 4 has reached a limit is decided based on an output signal from a back pressure sensor that is provided on the exhaust passage 4. Whether the back pressure of the exhaust passage 4 has reached a limit can also be decided based on a reduction level of the intake air due to a rise in the back pressure, or an aggravation level of a combustion state of the internal combustion engine 1 due to a rise in the back pressure. It is also possible to set a plurality of collection terminating conditions.

At step S11 of the flowchart shown in FIG. 4, the recirculating permission condition includes that the catalytic converter 7 is activated to a predetermined level. It is also possible to set other recirculating permission condition by relating it to the operation state of the internal combustion engine 1. Particularly, when the exhaust gas is returned to the intake passage 3, it is possible to set the following as the recirculating permission conditions: that the aggravation of the combustion state due to the recirculating of the exhaust gas is within a predetermined permissible range; the warm up state of the internal combustion engine 1 reaches a predetermined level; and a negative pressure is being applied to the intake passage 3.

In the embodiments of the exhaust gas purifying apparatus that returns the exhaust gas to the exhaust passage 4 shown in FIG. 5 and FIG. 11, a separate catalytic converter may be provided on the exhaust passage 4 at a position upstream from the catalytic converter 7. In this case, the exhaust gas introduction passage 13 can be set to be able to return the exhaust gas to the exhaust passage 4 at a position upstream from the separate catalytic converter. It is also possible to return the exhaust gas to the exhaust passage 4 at a position sandwiched between a plurality of catalytic converters. It is also possible to return the exhaust gas to both the exhaust passage 4 at a further upstream position from an upstream catalytic converter and to the exhaust passage 4 at a position sandwiched between a plurality of catalytic converters. In this case, the upstream catalytic converter is activated earlier. Therefore, it is possible to advance the recirculating starting timing of the exhaust gas by matching the timing with this activation timing.

In the present invention, the collection vessel may be disposed at a suitable position of the vehicle. For example, the collection vessel may be disposed in a suitable space that exists in a bumper, a roof, a trunk, a under floor, or the like. It is also possible to dispose collection vessels at a plurality of dispersed position.

As explained above, in the exhaust gas purifying method and the exhaust gas purifying apparatus according to the present invention, the apparatus collects exhaust gas into the collection vessel from the time of starting the internal combustion engine. Therefore, it is possible to restrict the discharging of harmful components from the internal combustion engine to the atmosphere immediately after the starting of the internal combustion engine without adsorbing the harmful components contained in the exhaust gas. As a result, it is possible to improve the characteristics of purifying the exhaust gas immediately after the starting of the internal combustion engine in a more simple structure.

What is claimed is:

1. An exhaust gas purifying method for purifying exhaust gas from an internal combustion engine by using a catalytic converter, the method comprising:
   a process of collecting at least a part of the exhaust gas discharged from the internal combustion engine into a collection vessel during a period from a starting time of the internal combustion engine to satisfaction of a predetermined collection terminating condition; and
   a process of recirculating the exhaust gas collected in the collection vessel to an upstream side from the catalytic converter,
   wherein, in the collection process, a part of the exhaust gas is introduced to the catalytic converter, and a remaining part of the exhaust gas is collected into the collection vessel, the part of the exhaust gas introduced to the catalytic converter flowing to the atmosphere without being collected into the collection vessel.

2. The exhaust gas purifying method according to claim 1, wherein the collection terminating condition includes that an activation state of the catalytic converter has reached a predetermined level.

3. The exhaust gas purifying method according to claim 1, wherein the collection terminating condition includes that a collection state of the exhaust gas into the collection vessel has reached a predetermined limit.

4. The exhaust gas purifying method according to claim 1, wherein the recirculating of the exhaust gas from the collection vessel is prohibited at the time of starting the collection of the exhaust gas into the collection vessel, and the prohibition of the recirculating is cancelled when a predetermined recirculating permission condition has been satisfied.

5. The exhaust gas purifying method according to claim 1, wherein the recirculating of the exhaust gas from the collection vessel is started after an activation state of the catalytic converter has reached the predetermined level.

6. The exhaust gas purifying method according to claim 1, further comprising a process of stopping the collection of the exhaust gas into the collection vessel when the collection terminating condition has been satisfied.

7. The exhaust gas purifying method according to claim 1, wherein, in the collection process, a total quantity of the exhaust gas is collected into the collection vessel.

8. The exhaust gas purifying method according to claim 1, wherein, in the recirculating process, the exhaust gas is recirculated to an intake passage.

9. The exhaust gas purifying method according to claim 1, wherein, in the collection process, the exhaust gas is compressed and collected into the collection vessel.

10. The exhaust gas purifying method according to claim 1, wherein the exhaust gas is introduced into the collection vessel from an exhaust passage at a position upstream from the catalytic converter.

11. The exhaust gas purifying method according to claim 10, further comprising a process of heating the catalytic converter with a heating device, in parallel with the collection of the exhaust gas into the collection vessel.

12. The exhaust gas purifying method according to claim 1, wherein, in the recirculating process, the exhaust gas is recirculated to the exhaust passage at a position upstream from the catalytic converter.

13. The exhaust gas purifying method according to claim 12, wherein pressure is applied to the exhaust gas in the collection vessel, to return the exhaust gas to the exhaust passage.

14. An exhaust gas purifying apparatus that purifies exhaust gas from an internal combustion engine by using a catalytic converter, the apparatus comprising:
    a collection vessel that can hold exhaust gas;
    an exhaust gas taking-out passage through which exhaust gas is introduced from an exhaust passage of the internal combustion engine to the collection vessel;
    an exhaust gas introduction passage through which the exhaust gas is introduced from the collection vessel to an upstream side from the catalytic converter;
    a first valve device that is switchable between a position where the introduction of the exhaust gas from the exhaust passage to the exhaust gas taking-out passage is permitted and a position where the introduction of the exhaust gas is prevented;
    a second valve device that is switchable between a position where the introduction of the exhaust gas to the upstream side from the catalytic converter through the exhaust gas introduction passage is permitted and a position where the introduction of the exhaust gas is prevented; and
    a valve control device that controls the first valve device such that at least a part of the exhaust gas discharged from the internal combustion engine is collected into the collection vessel through the exhaust gas taking-out passage during a period from a starting time of the internal combustion engine to satisfaction of a predetermined collection terminating condition,
    wherein the first valve device is switchable to a position where a part of the exhaust gas is introduced to the catalytic converter, and a remaining part of the exhaust gas is introduced to the exhaust gas taking-out passage, the part of the exhaust gas introduced to the catalytic converter flowing to the atmosphere without being collected into the collection vessel.

15. The exhaust gas purifying apparatus according to claim 14, wherein the collection terminating condition includes that an activation state of the catalytic converter has reached a predetermined level.

16. The exhaust gas purifying apparatus according to claim 14, wherein the collection terminating condition includes that a state of collecting the exhaust gas into the collection vessel has reached a predetermined limit.

17. The exhaust gas purifying apparatus according to claim 14, wherein the valve control device controls the second valve device so as to prohibit the recirculating of the exhaust gas from the collection vessel at the time of starting the collection of the exhaust gas into the collection vessel, and cancel the prohibition of the recirculating when a predetermined recirculating permission condition has been satisfied.

18. The exhaust gas purifying apparatus according to claim 14, wherein the valve control device controls the second valve device so as to start the recirculating of the exhaust gas from the collection vessel after an activation state of the catalytic converter has reached the predetermined level.

19. The exhaust gas purifying apparatus according to claim 14, wherein the valve control device controls the first valve device so as to stop the collection of the exhaust gas into the collection vessel when the collection terminating condition has been satisfied.

20. The exhaust gas purifying apparatus according to claim 14, wherein the first valve device is switchable to a position where a total quantity of the exhaust gas is introduced to the exhaust gas taking-out passage.

21. The exhaust gas purifying apparatus according to claim 14, wherein the exhaust gas introduction passage is connected to an intake passage.

22. The exhaust gas purifying apparatus according to claim 14, further comprising a compressing device that compresses the exhaust gas to feed the exhaust gas into the collection vessel.

23. The exhaust gas purifying apparatus according to claim 14, wherein the collection vessel is formed in a shape of a bag whose volume is variable.

24. The exhaust gas purifying apparatus according to claim 14, wherein the exhaust gas taking-out passage is branched from the exhaust passage at a position upstream from the catalytic converter.

25. The exhaust gas purifying apparatus according to claim 24, further comprising a heating device that heats the catalytic converter and a heating control device that causes the heating device to perform heating in parallel with the collection of the exhaust gas into the collection vessel.

26. The exhaust gas purifying apparatus according to claim 14, wherein the exhaust gas introduction passage is connected to the exhaust passage at a position upstream from the catalytic converter.

27. The exhaust gas purifying apparatus according to claim 26, further comprising a pressurizing device that applies pressure to the exhaust gas within the collection vessel to feed the exhaust gas to the exhaust passage.

28. An exhaust gas collecting apparatus of an internal combustion engine, comprising:
    a collection vessel that can hold exhaust gas discharged from the internal combustion engine;
    an exhaust gas taking-out passage through which exhaust gas is introduced from an exhaust passage of the internal combustion engine to the collection vessel;

an exhaust gas introduction passage through which the exhaust gas is introduced from the collection vessel to the exhaust passage at a position upstream from a catalytic converter;

a first valve device that is switchable between a position where the introduction of the exhaust gas from the exhaust passage to the exhaust gas taking-out passage is permitted and a position where the introduction of the exhaust gas is prevented; and a second valve device that is switchable between a position where the introduction of the exhaust gas from the exhaust gas introduction passage to the exhaust passage is permitted and a position where the introduction of the exhaust gas is prevented, wherein the first valve device is switchable to a position where a part of the exhaust gas is introduced to the catalytic converter, and a remaining part of the exhaust gas is introduced to the exhaust gas taking-out passage, the part of the exhaust gas introduced to the catalytic converter flowing to the atmosphere without being collected into the collection vessel.

29. The exhaust gas collecting apparatus according to claim 28, wherein the exhaust gas taking-out passage is branched from the exhaust passage at a position upstream from the catalytic converter.

30. The exhaust gas collecting apparatus according to claim 28, wherein the first valve device is switchable to a position where a total quantity of the exhaust gas is introduced to the exhaust gas taking-out passage.

31. The exhaust gas collecting apparatus according to claim 28, further comprising a pressurizing device that applies pressure to the exhaust gas within the collection vessel to feed the exhaust gas to the exhaust passage.

32. The exhaust gas collecting apparatus according to claim 28, further comprising a compressing device that compresses the exhaust gas to feed the exhaust gas into the collection vessel.

33. The exhaust gas collecting apparatus according to claim 28, wherein the collection vessel can be deformed according to a quantity of collected exhaust gas.

* * * * *